(12) United States Patent
Fan

(10) Patent No.: US 6,201,498 B1
(45) Date of Patent: Mar. 13, 2001

(54) GPS RECEIVER WITH CLOSE RANGE WIRELESS COMMUNICATION PORT

(76) Inventor: Judy Fan, 323 Lower Vintners Cir., Fremont, CA (US) 94539

( * ) Notice: Subject to any disclaimer, the term of this patent is extended or adjusted under 35 U.S.C. 154(b) by 0 days.

(21) Appl. No.: 09/193,161

(22) Filed: Nov. 17, 1998

(51) Int. Cl.[7] ............................... G01S 5/02; G06F 19/00
(52) U.S. Cl. .................. 342/357.09; 701/200; 701/213; 342/357.01; 342/357.06
(58) Field of Search ...................................... 701/200, 207, 701/213, 214, 215, 216, 217, 3; 342/357.01, 357.09, 357.06, 357.11

(56) References Cited

U.S. PATENT DOCUMENTS 5,933,110 * 8/1999 Tang et al. ...................... 342/357.11
6,064,922 * 5/2000 Lee ............................................ 701/3

* cited by examiner

Primary Examiner—Bernarr E. Gregory

(57) ABSTRACT

A global position satellite (GPS) receiver constructed with a close range wireless communication port to facilitate the down loading of processed global p signal and to facilitate the communication between a handheld computing device and the GPS receiver. The handheld computing device is adjacent to the GPS receiver with close range wireless communication port to obtain processed position information from said GPS receiver.

7 Claims, 2 Drawing Sheets

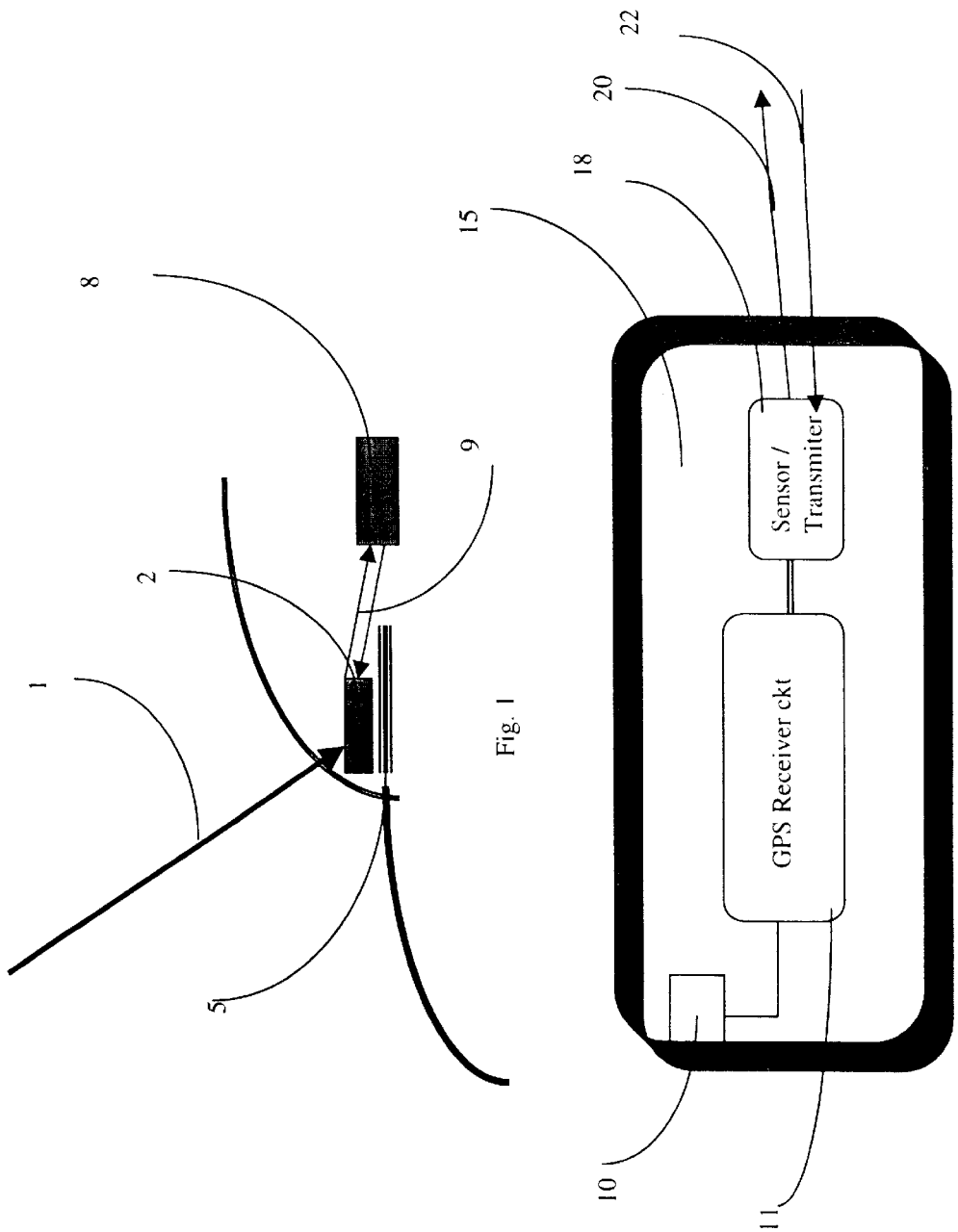

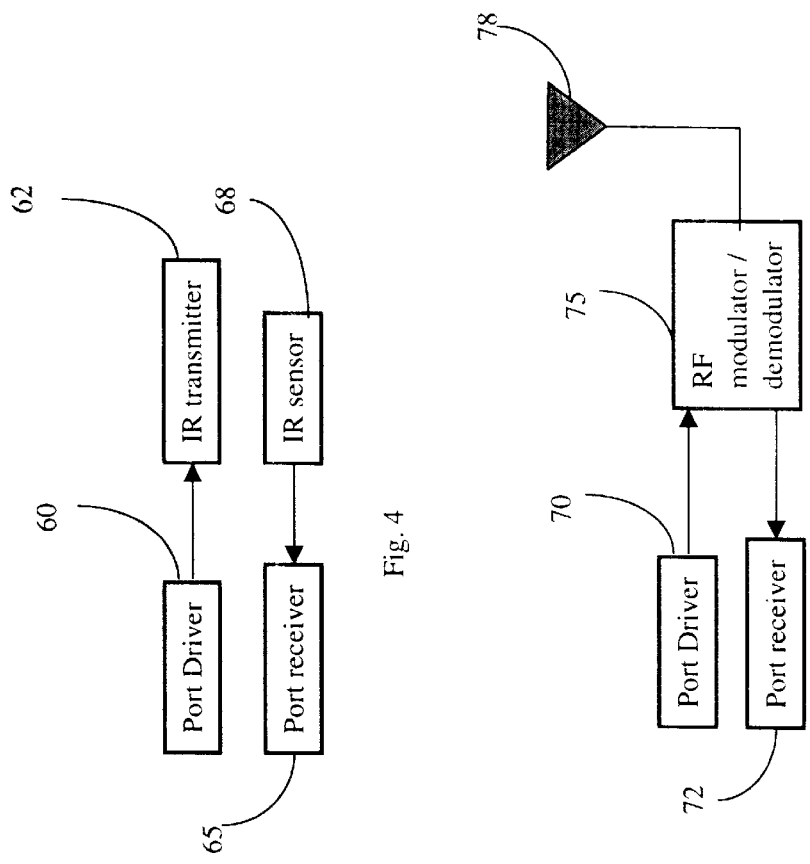
Fig. 4
Fig. 5
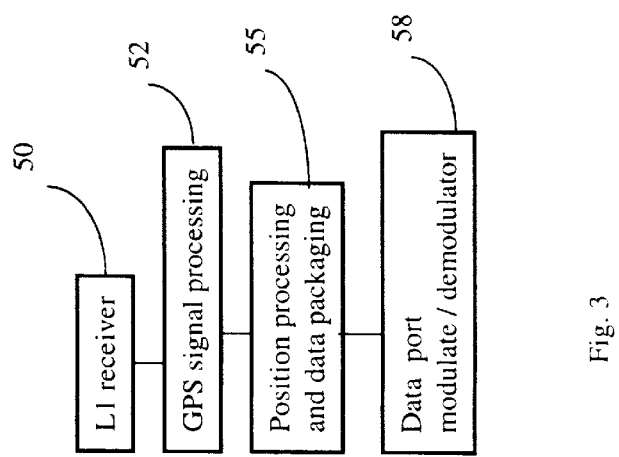
Fig. 3

GPS RECEIVER WITH CLOSE RANGE WIRELESS COMMUNICATION PORT

BACKGROUND

1. Field of Invention

This invention relates to a global position satellite (GPS) receiver with built-in wireless communication device for exchanging data with a handheld computing device in close range.

2. Prior Art

Today's consumer GPS receiver includes portable receivers utilized to collect and display position information. These receivers include smart antenna for direct connections to a portable computer, plug-in receivers using PC card technology for direct connections, and several other receivers, which offer other cumbersome and expensive method for in-vehicle navigation. Other receivers offer cables to connect to a computer by which to exchange data. The cables are either permanently attached to the receiver or must be connected or disconnected with both hands.

Numerous GPS receivers used in an automobile today communicates with a computing device such as laptop computer through a wired RS-232 port. A typical GPS receiver utilized in a vehicle is either a completely integrated receiver with display and map for purpose of position and navigation. A second approach is to use a GPS receiver, which is secured on a vehicle; driver or passenger of the vehicle utilize their standard computing device such as a portable computer to input or to retrieve the position information. The computing device is connected to the GPS receiver through a wired RS-232 port. A typical GPS receiver of this type is commercially available and is called "smart antenna". The smart antenna receives GPS information, process position information and make it available on an RS-232 port. User retrieves the position information from this port through a wired RS-232 connection. The arrangement is cumbersome. The connection is typically only good for a single computing device.

Objects and Advantages

Accordingly, the objects and advantages is to provide close range wireless data communication between a GPS receiver processing unit and a portable data processing equipment such as a lap-top computer within a vehicle for instant position identification and navigation. It eliminates the cumbersome wire connections and also allows the GPS receiver to be capable of being utilized by multiple data processing equipment.

BRIEF DESCRIPTIONS OF THE DRAWINGS

FIG. 1 illustrates a hardware setup for the main embodiment where a GPS receiver with close range wireless communication port interacting with a handheld computer with complementary wireless communication port.

FIG. 2 illustrates the main embodiment where a GPS receiver is built with a close range sensor and transmitter.

FIG. 3 illustrates a hardware block diagram of the main embodiment.

FIG. 4 illustrates the hardware construction block diagram of a close range infrared wireless port setup.

FIG. 5 illustrates the hardware construction block diagram of a close range radio frequency wireless port setup.

SUMMARY OF THE INVENTION AND DETAIL DESCRIPTIONS OF THE DRAWINGS

In accordance with the invention, a GPS receiver 2 is secured on the front dashboard 8 of an automobile. The GPS receiver receives GPS satellite signal 1 through the front windshield of the automobile. A close range wireless port on the GPS receiver 2 communicates with a handheld computer 8. Close range wireless signal path 9 between GPS receiver 2 and handheld computer 8 establishes the communication link. GPS processing is familiar to the skill of art.

FIG. 2 represents a block diagram of the construction of the main embodiment, a GPS receiver 15 built with close range wireless signal sensor/transmitter 8. GPS receiver 15 receives GPS signal through antenna 10; it processes the received signal through GPS receiver circuit 11 and generates serial position data. Serial position data is processed through sensor/transmitter block 18 to generate close range output transmit data 20. Signal 22 is the received close range data and command from hand held computer 8.

FIG. 3 illustrates the operating sequence of the main embodiment where GPS signal is received through L1 signal receiver 50. L1 signal is the modulated GPS signal transmitted from GPS receiver to earth. The received L1 signal is processed through GPS signal processing block 52. The processed GPS signal is further packaged through position processing and data packaging block 55. This packaged data is interfaced through data post modulate/demodulator 58 for close range wireless communication with the in vehicle handheld computer 8.

FIG. 4 illustrates the detail of block 58 using infrared (IR) port for the close range wireless communications. A port driver 60 translates the packaged GPS data to appropriate level for IR transmitter 62. IR sensor 68 receives external command and response signal from handheld computer and communicates with GPS position processing and data packaging circuit 55 through port receiver 65.

FIG. 5 illustrates the detail of block 58 using close range radio frequency (RF) signal. A port driver 70 translates the packaged GPS data to appropriate level for the RF modulator 75. Modulated signal transmits through antenna 78. Antenna 78 also receives external command and response signal from handheld computer and communicates with GPS position processing and data package circuit 55 through demodulator block 75 and port receiver 72.

Transmit and receiver protocol utilize standard RS-232 type setup which is similar to the infra-red port communication standard as desk top computers and personal computers. This implementation is familiar to the trade.

I claim:

1. A machine for providing position reference information of an automobile through wireless communication link comprising
   a. a global position receiver;
   b. a wireless communication converter circuit with a transmission range substantially close to a physical range of a parking lot of common walking distance; whereby said global position receiver receives ranging information from global positioning satellites and processes to obtain position reference information, whereby said position reference information is packetized in digital format and transmits through said wireless communication converter circuit.

2. In claim 1 where said machine is secured in said automobile and where said wireless communication converter circuit transmits within said automobile.

3. In claim 1 where said close range wireless communication converter is an infrared communication port.

4. In claim 1 where said close range wireless communication converter is a short distance radio frequency port.

5. A method to obtain instant position information through a wireless arrangement inside an automobile comprising:

a. a global positioning receiver with a wireless transfer port secured on said automobile where said wireless transfer port communicates wirelessly through a physical distance substantially equivalent to a range of a parking lot of walking distance;

b. a portable computing device with complimentary wireless transfer port to said wireless transfer port of said global positioning receiver; said global positioning receiver processes a position reference information and transmit to said portable computing device for subsequent processing and display by said portable computing device.

6. In claim 5 where said portable-computing device is a hand-held computer.

7. In claim 6 where said portable computing device displays said position reference information.

* * * * *